United States Patent [19]

Pistoresi

[11] Patent Number: 4,845,718

[45] Date of Patent: Jul. 4, 1989

[54] METHOD AND APPARATUS FOR FEL SIDEBAND SUPPRESSION

[75] Inventor: Denis J. Pistoresi, Seattle, Wash.

[73] Assignee: The Boeing Company, Seattle, Wash.

[21] Appl. No.: 203,679

[22] Filed: Jun. 7, 1988

[51] Int. Cl.⁴ .............................................. H01S 3/00
[52] U.S. Cl. ........................................ 372/2; 372/25; 372/18; 372/102
[58] Field of Search ................ 372/2, 93, 25, 18, 102

[56] References Cited

U.S. PATENT DOCUMENTS

| | | | |
|---|---|---|---|
| 3,549,239 | 12/1970 | Brienza et al. | 350/212 |
| 3,646,470 | 2/1972 | Tseng | 331/94.5 |
| 3,691,477 | 9/1972 | Janney | 331/94.5 |
| 4,219,786 | 8/1980 | Chester | 331/94.5 |
| 4,238,141 | 12/1980 | Greiner | 350/162 R |
| 4,287,488 | 9/1981 | Brau et al. | 331/94.5 |
| 4,361,889 | 11/1982 | Johnson | 372/95 |
| 4,529,942 | 7/1985 | Patel et al. | 330/4.3 |
| 4,748,629 | 5/1988 | Edlin et al. | 372/2 |

Primary Examiner—Léon Scott, Jr.
Attorney, Agent, or Firm—Mary Y. Redman

[57] ABSTRACT

In an FEL, unwanted sidebands in the laser pulses are suppressed by the introducing of a temporal dispersion of the sideband with respect to the main wavelength, causing a time lag between the main wavelength and the sideband. This is preferably accomplished by the use of diffraction gratings in a grating rhomb within a ring resonator. The first of the gratings in the rhomb has a zero order diffraction which can be used for outcoupling. Tuning in real time is achieved by adjusting the positions of the elements in the ring resonator so that the desired wavelength will be in spatial overlap with the electron pulses in the wiggler.

12 Claims, 1 Drawing Sheet

METHOD AND APPARATUS FOR FEL SIDEBAND SUPPRESSION

FIELD OF THE INVENTION

This invention relates to methods and apparatus for use with a free electron laser (FEL), and more specifically, to methods and apparatus for FEL sideband selection or suppression.

BACKGROUND OF THE INVENTION

The free electron laser, or FEL, is a unique laser device in which a beam of electrons is deflected by a linear array of electrical or magnetic fields of alternately opposite polarities. The array, aptly referred to in the art as a "wiggler," imparts an undulating movement to the electron beam which causes emission of laser radiation. This can be used directly or can be applied to an existing laser beam to amplify it. A radio frequency FEL, or RF FEL, both generates a laser beam and amplifies it within an optical cavity. The RF FEL is suited to operate at very high powers, and can operate more efficiently than chemical or excimer lasers. It also has the potential for wavelength tunability. (In the remainder of this discussion the term FEL is intended to mean radio frequency FEL.) U.S. Pat. No. 4,287,488 issued on Sept. 1, 1981 to Brau et al. gives an overview of the theory of the RF FEL, and is incorporated herein by reference.

To realize the full potential of the RF FEL in both commercial and military applications, lasing at sideband wavelengths must be suppressed. Suppressing the sideband wavelengths is estimated to increase the electrical to optical efficiency by a factor of two to five. If a sideband suppressor were tunable, this would further allow tuning the FEL wavelength in real time.

Prior attempts at sideband suppression have involved narrow bandpass or sharp cutoff multilayer dielectric coatings on elements which attenuate unwanted sideband wavelengths. But this approach does not provide real time tunability over an appreciable wavelength range. While small variations in wavelength can be accomplished by varying the incident angle of the beam on the element, large wavelength variations necessitate the replacing of the element with one of different optical characteristics. This could take hours, or even days.

Some presently used devices place the dielectric coating on a transmissive element to couple energy out of the FEL. But this limits power and run time because appropriate transmissive materials are poor thermal conductors, and thus do not cool as needed. This is especially true at short wavelengths. Other designs would place the multilayer dielectric coatings on one of the resonator mirrors, but this approach limits the range of tunability.

One possible approach to sideband suppression is the use of a single grating to introduce an angular dispersion of the sideband. However, a grating which creates sufficient angular dispersion to use for outcoupling also strongly degrades or even destroys the performance of the FEL at the desired frequency. This is due to the broadening of the focus of the main line and also the deflection of the main line's position. This reduces laser intensity in the wiggler and therefore the effective energy transfer from the free electrons to the laser photons at the desired wavelength. Outcoupling also becomes problematic with a low dispersion that does not degrade laser performance, since it is difficult to achieve sufficient physical separation between the zero and first order within a reasonable distance. This alternative for sideband suppression thus introduces other problems into the performance of the FEL.

SUMMARY OF THE INVENTION

The claimed invention solves these problems encountered in FEL operation. It will suppress unwanted sidebands while not interfering with the performance of the FEL. It will instead enhance the performance of the FEL, increasing its efficiency, allowing for real time tuning of the FEL, and also will provide effective outcoupling of the laser beam. This is accomplished by a method and apparatus which introduces a temporal dispersion of the sideband with respect to the main line, causing a time lag between the main line and the sideband. This is preferably accomplished by the use of elements such as diffraction gratings configured in a grating rhomb within a ring resonator. When the laser beam returns to the wiggler after passing around the ring resonator, the sideband will have been walked out of overlap with the electron pulses.

In a preferred embodiment, the first of the gratings in the rhomb has a zero order diffraction which can be used for outcoupling. Tuning in real time is achieved by adjusting the positions of the elements in the ring resonator so that the desired wavelength will be in spatial overlap with the electron pulses in the wiggler.

DETAILED DESCRIPTION OF THE PREFERRED EMBODIMENT

Figure 1:
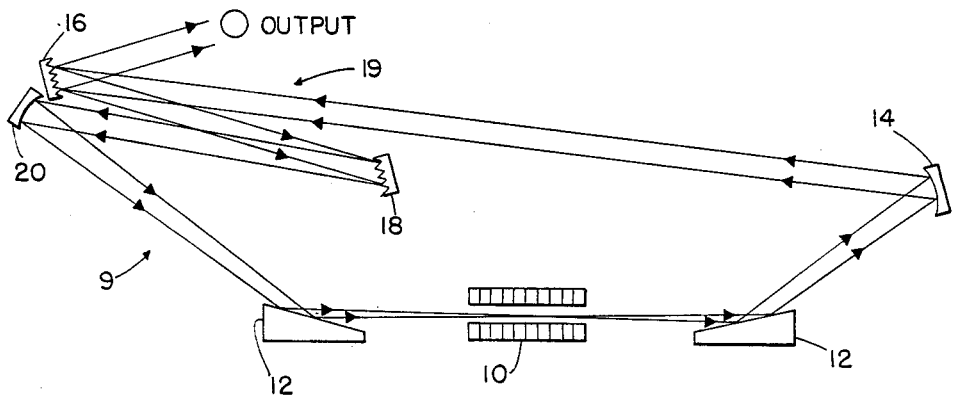
FIG. 1 is a schematic representation of an RF FEL ring resonator including a preferred embodiment of the claimed invention.

Referring first to FIG. 1, a typical RF FEL includes an electron source (not shown) which introduces pulses of electrons into a wiggler 10, where an oscillating movement is imparted to the electrons, producing a pulsed laser beam. As will be discussed more fully below, a portion of the laser beam is outcoupled and the remainder is fed back into the wiggler. This results in laser amplification when the laser pulses are in spatial overlap with the electron pulses.

In connection with the claimed invention, use of a ring resonator (indicated generally at 9) has been found to be advantageous in that it reduces intensity on the optical elements and reduces sensitivity to angular misalignment of elements. Using a ring resonator configuration, the laser beam propagates from the wiggler 10 to a first grazing mirror 12, off a collimating mirror 14, and then to the first element of the sideband suppressor 16. A portion of the beam can be outcoupled at this point in a manner discussed more fully below, with the remainder propagating to the second sideband suppressor element 18, off a second collimating mirror 20, to a second grazing mirror 22, and back into the wiggler 10. The grazing mirrors 12 and 22 are advantageous in reducing the path length within the resonator.

Figure 2:
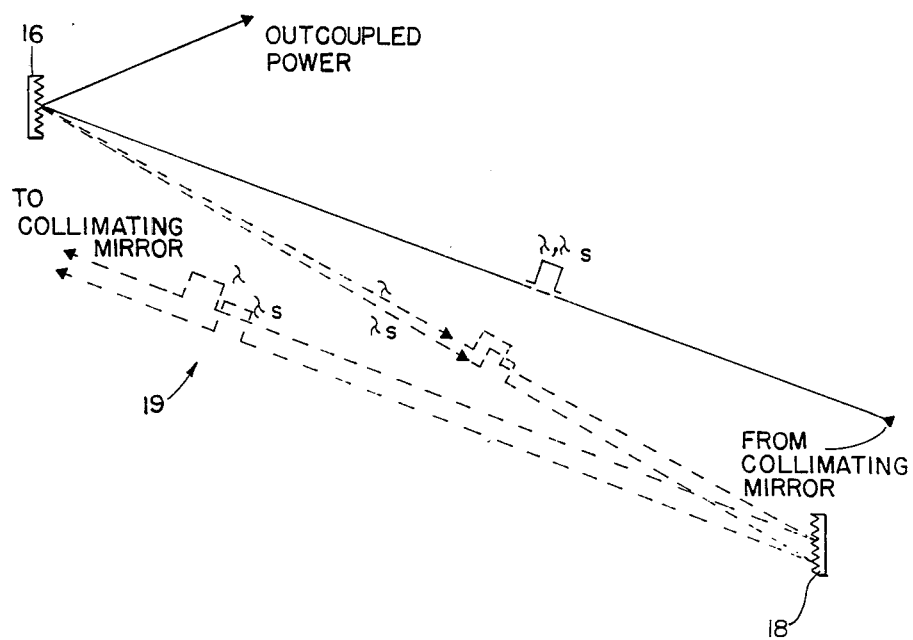
FIG. 2 is a schematic representation of the embodiment of FIG. 1.

Referring to both FIGS. 1 and 2, the two sideband suppressor elements 16, 18 in the preferred embodiment are a pair of diffraction gratings configured to form a grating rhomb (indicated generally at 19) in which they need not be maintained parallel to each other. Both the angular alignment and length adjustment of the resonator can be accomplished with these elements, thus alleviating the need for insertion of extra elements into the resonator 9.

The sideband suppression elements 16, 18 are further advantageous in that they allow for outcoupling of the laser beam by using the zero order diffraction from the first element 16 for outcoupling. Outcoupling is thus accomplished in a convenient manner, without the need for extra optical elements, and with minimal perturbation of the remainder of the beam. The angular dispersion at the first grating's first order is cancelled by the matched dispersion of the second grating element 18, which preferrably is a high efficiency grating which produces only one diffracted order. It does not produce a zero order output. This double grating cancels the wavelength dependent angular dispersion but introduces an effective temporal dispersion which delays the sideband wavelength in time.

FIG. 2 shows the time dispersion of the sideband with respect to the main line. The optical micropulse travelling from the collimating mirror 14 (not shown in this figure) contains a main line wavelength $\lambda$ and a sideband wavelength $\lambda_s$. In a typical case, the sideband wavelength could be about 1.3% longer than the main line wavelength, which could be about 1 micrometer in a typical case. As the beam leaves the first element 16, that portion of the pulse at $\lambda_s$ is out of overlap with that portion at $\lambda$. The delay between them is increased as the beam leaves the second element 18 to propagate back to the second collimating mirror 20.

The line density on the grating elements 16, 18 is chosen so that only one diffractive order is obtained to achieve high efficiency for the second grating element 18. The angle of incidence for the first grating element 16 and the wavelength of the main FEL output also are factors in the choice of the line density. In the example given above, 900 lines per millimeter would be preferred, and would yield a lag between $\lambda$ and $\lambda_s$ which is greater than the 30 picoseconds pulsewidth. Since the sideband wavelength is shifted on every pass through the resonator, this system is 100% effective in suppressing high gain sidebands.

Some slight lateral displacement of the unwanted sideband radiation may occur. But this effect is not of sufficient magnitude to degrade that portion of the pulse at the main wavelength or wiggler performance. In the example given here, the temporal spreading of the 30 picosecond micropulse is only about 1 to 2%, a minimal amount which is not detrimental to FEL performance. For longer pulse lengths, the instantaneous optical bandwidth is even smaller, making any detrimental effect almost nonexistent.

Use of existing silicon cooled mirror technology in the sideband suppression elements 16, 18 is highly advantageous in that such gratings can be used with high average power FEL output. Gratings utilizing this technology are formed by etching the grating on a silicon substrate by well known chemical or ion beam etching processes and then coating the grating with a highly reflective metal. Silver coating is preferrable for both visible and longer wavelengths; gold could be used at longer wavelengths, as could be copper. To obviate the problem of increased absorption as the silver tarnishes, protective overcoatings can be utilized. Silver overcoated with LiF has been demonstrated to be useful in high intensity operation over a micropulse length of 4 microseconds. A thin layer of ThF can also be used, with the high reflectivity of silver being maintained. The processes which can be used to produce such gratings are familiar to those having ordinary skill in the art. Gratings of other materials are within the scope of the invention. Gratings can, for example, be ion etched on a variety of semiconductor, metal, and dielectric substrates.

Tuning of the FEL can be accomplished by adjusting the total resonator length by moving one of the resonator elements, with suitable means such as a piezoelectric or voice coil drive, to increase or decrease the total path around the resonator so that the photons of the desired wavelength are in spatial overlap with the electron micropulses. This is important, since tunability over a wide range could make ineffective a specific wavelength dependent laser materials hardening countermeasure in a military setting.

Although particular embodiments of the invention have been discussed for illustrative purposes, it will be apparent that various modifications may be made by those skilled in the art without departing from the scope or spirit of the invention. For example, while particular grating manufacturing techniques and materials have been suggested, the concept of the invention is not limited to those particulars. The actual scope of the invention is to be indicated only by reference to the following claims.

What is claimed is:

1. In a free electron laser which includes a wiggler through which electron pulses traverse and which outputs a series of laser pulses within an output beam, each laser containing a main line of a desired wavelength and at least one sideband of an undesired wavelength, an apparatus for suppressing the sideband comprising:

a first means for imparting a temporal dispersion between the sideband and the main line and directing the laser pulse in a first predetermined direction;

a second means for imparting further temporal dispersion and directing the laser pulse in a second predetermined direction, said second dispersion imparting means being positioned to receive the laser pulse as it travels in said first predetermined direction, the temporal dispersion which is imparted by said first and second temporal dispersion imparting elements being an amount between the time duration of the laser pulse and the time duration between two adjacent laser pulses within the output beam;

means for directing the laser pulse from the wiggler to said first temporal dispersion imparting element; and means for directing the laser pulse traveling in said second given direction back into the wiggler.

2. The apparatus of claim 1 wherein said first dispersion imparting means further comprises means for directing a portion of the laser pulse in a third predetermined direction, whereby said portion of the laser pulse is outcoupled from the free electron laser.

3. The apparatus of claim 2 wherein said first dispersion imparting means and said second dispersion imparting means include a first grating and a second grating, respectively.

4. The apparatus of claim 3 wherein said first diffraction grating is configured to produce diffraction of a zero order, whereby said zero order diffraction provides outcoupling of said laser pulse.

5. The apparatus of claim 3 wherein said first and second gratings each include a semiconductor substrate having a grating pattern thereon.

6. The apparatus of claim 5 wherein said substrate comprises a silicon substrate.

7. The apparatus of claim 3 wherein said first and second gratings each include a metal substrate having a grating pattern thereon.

8. The apparatus of claim 3 wherein said first and second gratings each include a dielectric substrate having a grating pattern thereon.

9. The apparatus of claim 5, 7, or 8 wherein said first and said second gratings each further include a coating of a reflective metal on said substrate.

10. The apparatus of claim 1 wherein at least one of said first and second dispersion imparting means is movable in a manner wherein photons of a desired wavelength will be placed in spatial overlap with electron pulses in the wiggler.

11. A method for suppressing a sideband in a laser pulse output from a free electron laser wiggler, said pulse containing a main line wavelength and said sideband, said method including the steps of:
    directing said pulse from said wiggler to a dispersion creating system;
    creating a temporal dispersion between said sideband and said main line at said dispersion creating system, the temporal dispersion being of an amount between the time duration of the laser pulse and the time duration between successive pulses in said output; and
    returning at least a portion of said pulse to said wiggler.

12. The method of claim 11 further comprising the step of outcoupling a portion of said pulse substantially simultaneously with the step of creating said temporal dispersion.

* * * * *

UNITED STATES PATENT AND TRADEMARK OFFICE
CERTIFICATE OF CORRECTION

PATENT NO. : 4,845,718
DATED : July 4, 1989
INVENTOR(S) : Denis J. Pistoresi

It is certified that error appears in the above-identified patent and that said Letters Patent is hereby corrected as shown below:

Claim 1, line 4, after "laser", insert

-- pulse --.

Signed and Sealed this

Eighth Day of May, 1990

*Attest:*

HARRY F. MANBECK, JR.

*Attesting Officer*   *Commissioner of Patents and Trademarks*